US012689548B2

(12) United States Patent
Kim et al.

(10) Patent No.: US 12,689,548 B2
(45) Date of Patent: Jul. 21, 2026

(54) AUTOMOTIVE COMPUTING ARCHITECTURE WITH PHASED WAKE SEQUENCE AND POWER CONTROL

(71) Applicant: Tenstorrent AI ULC, Toronto (CA)

(72) Inventors: Yongbum Kim, Los Altos Hills, CA (US); Wei-han Lien, Saratoga, CA (US); Luke Yen, Woodinville, WA (US); Thaddeus Fortenberry, Dripping Springs, TX (US)

(73) Assignee: Tenstorrent AI ULC, Toronto (CA)

( * ) Notice: Subject to any disclaimer, the term of this patent is extended or adjusted under 35 U.S.C. 154(b) by 101 days.

(21) Appl. No.: 18/931,814

(22) Filed: Oct. 30, 2024

(65) Prior Publication Data

US 2025/0138624 A1     May 1, 2025

Related U.S. Application Data

(60) Provisional application No. 63/546,520, filed on Oct. 30, 2023.

(51) Int. Cl.
*H04L 41/04* (2022.01)
*B60R 16/023* (2006.01)
(Continued)

(52) U.S. Cl.
CPC ............ *H04L 41/04* (2013.01); *B60R 16/023* (2013.01); *G06F 1/3296* (2013.01);
(Continued)

(58) Field of Classification Search
CPC ... B60R 16/023; G06F 1/3287; G06F 1/3296; H04L 41/04; H04L 67/12; H04L 67/125; H04L 69/08
See application file for complete search history.

(56) References Cited

U.S. PATENT DOCUMENTS

| | | | |
|---|---|---|---|
| 2014/0188348 A1 | 7/2014 | Gautama et al. | |
| 2021/0132769 A1* | 5/2021 | Parikh | G06N 3/09 |

(Continued)

OTHER PUBLICATIONS

International Search Report and Written Opinion from International Application No. PCT/IB2024/060719 dated Mar. 12, 2025, 16 pages.

(Continued)

*Primary Examiner* — Terrell S Johnson
(74) *Attorney, Agent, or Firm* — Daylight Law, P.C.

(57) ABSTRACT

Methods and systems involving automotive computing architectures with phased wake sequences and power control are disclosed herein. A disclosed automotive computing system includes at least three subsystems: a first subsystem that is in an always-on power domain, a second subsystem that is powered on from a sleep state in response to an event detected by the first subsystem, and a third subsystem that is powered on, from an off state, after the first subsystem and the second subsystem are powered on. The subsystems of the architecture can be activated in different phases based on a given scenario in which the automotive computing architecture is operating. The same subsystem can occupy a different phase in different scenarios. The phased wake sequences may conserve power without sacrificing utility and may be optimized for different scenarios and triggering events.

19 Claims, 7 Drawing Sheets

200

Phased Power Provisioning for Different Subsystems in Automotive Computing Architecture

(51) Int. Cl.
  G06F 1/3287 (2019.01)
  G06F 1/3296 (2019.01)
  H04L 67/12 (2022.01)
  H04L 67/125 (2022.01)
  H04L 69/08 (2022.01)

(52) U.S. Cl.
  CPC .......... H04L 67/125 (2013.01); G06F 1/3287
      (2013.01); H04L 67/12 (2013.01); H04L 69/08
      (2013.01)

(56) References Cited

U.S. PATENT DOCUMENTS

| | | | |
|---|---|---|---|
| 2023/0014569 A1* | 1/2023 | Luban ................... | G06F 9/4418 |
| 2023/0264641 A1* | 8/2023 | Staudt ................... | B60R 16/023 |
| | | | 701/22 |
| 2025/0138624 A1* | 5/2025 | Kim ........................ | H04L 67/12 |

OTHER PUBLICATIONS

Ryan's Model Y. (May 6, 2022). *How well does Tesla's Keyless Entry actually work?* [Video]. YouTube. Retrieved Feb. 12, 2025, from [https://www.youtube.com/watch?v=ISWCSmChV0s](https://www.youtube.com/watch?v=ISWCSmChV0s).
Tesla. (Nov. 8, 2022). *Sentry mode*. Retrieved Feb. 12, 2025, from [https://www.tesla.com/ownersmanual/model3/en_us/GUID-56703182-8191-4DAE-AF07-2FDC0EB64663.html].

* cited by examiner

200

Phased Power Provisioning for Different Subsystems in Automotive Computing Architecture

FIG. 3

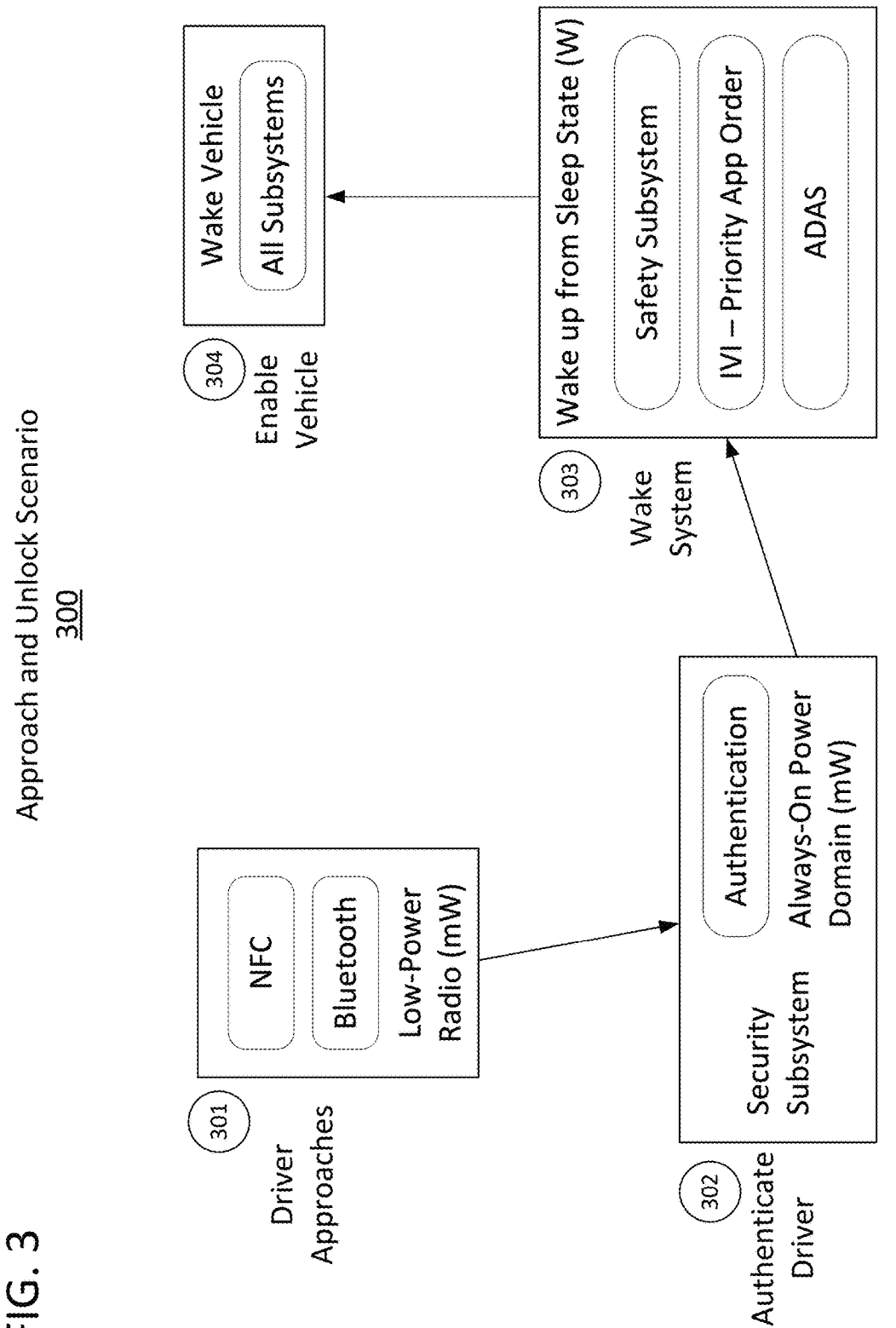

Approach and Unlock Scenario
300

301 Driver Approaches

NFC

Bluetooth

Low-Power Radio (mW)

302 Authenticate Driver

Authentication

Always-On Power Domain (mW)

Security Subsystem

303 Wake System

Wake up from Sleep State (W)

Safety Subsystem

IVI – Priority App Order

ADAS

304 Enable Vehicle

Wake Vehicle

All Subsystems

Granular Power Control allowing for target wake sequence and order

FIG. 4

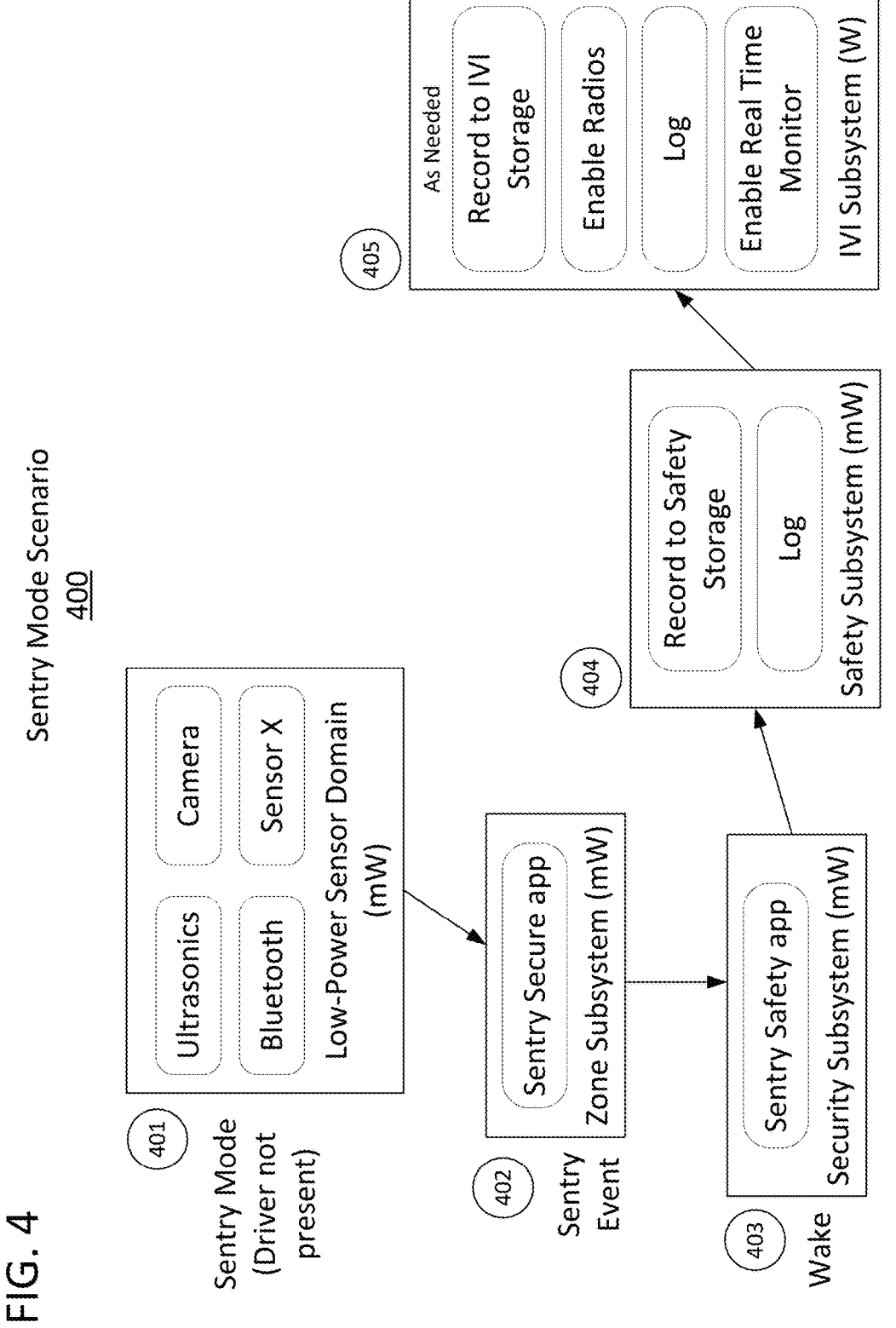

Sentry Mode Scenario
400

401 Sentry Mode (Driver not present)

Ultrasonics | Camera
Bluetooth | Sensor X
Low-Power Sensor Domain (mW)

402 Sentry Event

Sentry Secure app
Zone Subsystem (mW)

403 Wake

Sentry Safety app
Security Subsystem (mW)

404

Record to Safety Storage
Log
Safety Subsystem (mW)

405 As Needed

Record to IVI Storage
Enable Radios
Log
Enable Real Time Monitor
IVI Subsystem (W)

Wake up only minimal system. Leverage Safety Storage for most events

FIG. 5
500
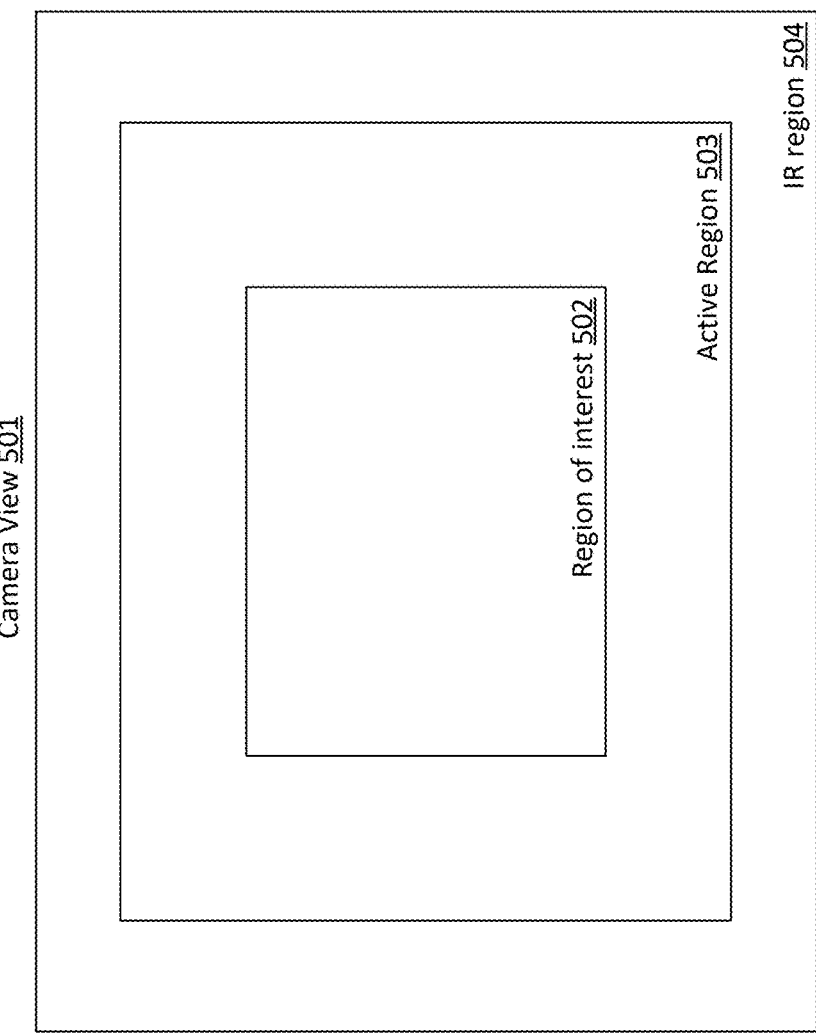

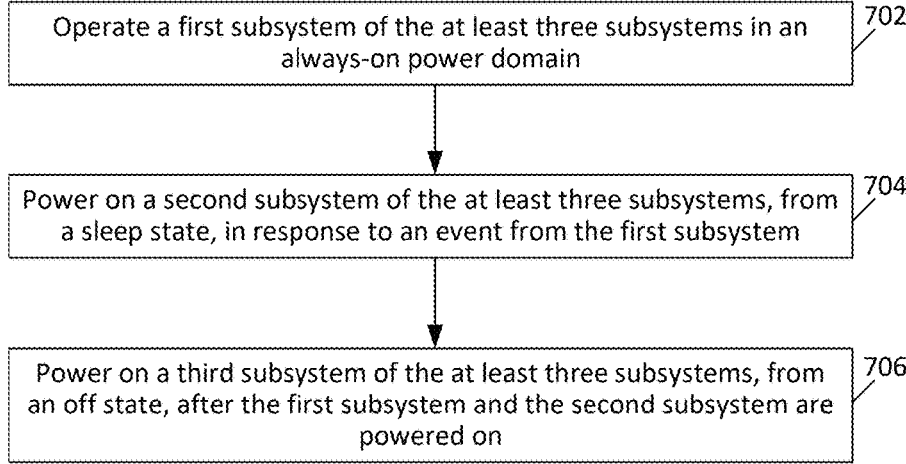

702 — Operate a first subsystem of the at least three subsystems in an always-on power domain 704 — Power on a second subsystem of the at least three subsystems, from a sleep state, in response to an event from the first subsystem 706 — Power on a third subsystem of the at least three subsystems, from an off state, after the first subsystem and the second subsystem are powered on

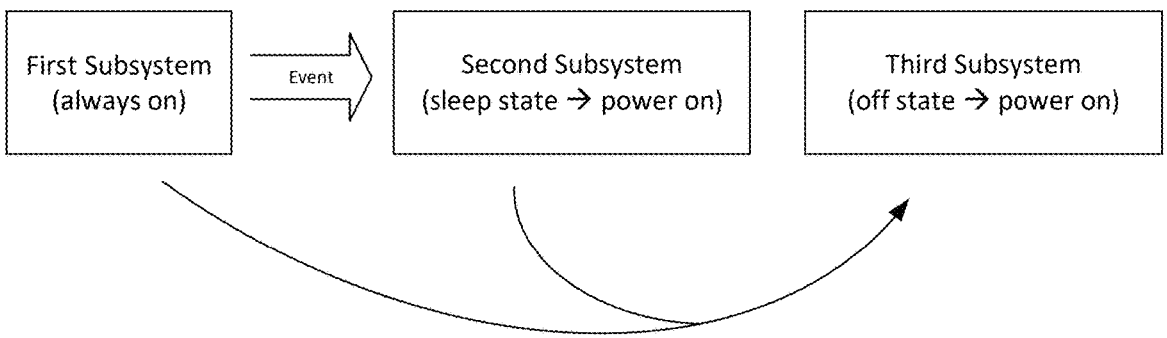

First Subsystem (always on)   Event   Second Subsystem (sleep state → power on)   Third Subsystem (off state → power on)

AUTOMOTIVE COMPUTING ARCHITECTURE WITH PHASED WAKE SEQUENCE AND POWER CONTROL

CROSS REFERENCE TO RELATED APPLICATIONS

This application claims the benefit of U.S. Provisional Patent Application No. 63/546,520, filed Oct. 30, 2023, which is incorporated by reference herein in its entirety for all purposes.

BACKGROUND

Cars are becoming increasingly computerized, with modern vehicles now relying heavily on sophisticated software and electronic systems to control everything from engine performance to driver assistance features. Gone are the days when vehicles were primarily mechanical; today's cars are equipped with multiple control units like the Engine Control Module (ECM) and Body Control Module (BCM) that regulate functions such as fuel injection, transmission shifting, and even climate control. Advanced technologies like adaptive cruise control, lane-keeping assist, and parking sensors are driven by sensors, cameras, and radar systems that continuously collect data processed by onboard computers. The integration of infotainment systems, touchscreen interfaces, and connectivity features like GPS and wireless updates further emphasizes how cars are evolving into highly networked, software-driven machines. Modern cars also include complex networking systems such as zonal networks which link together the various computing subsystems of an automotive computing architecture. As electric vehicles (EVs) and self-driving technologies continue to develop, the trend toward computerization in cars will only grow, with software becoming as crucial to vehicle operation as the hardware itself.

As cars become more computerized, the increasing number of sensors and the integration of artificial intelligence (AI) technologies are placing greater demands on automotive power and data infrastructures. Sensors now play a critical role in monitoring everything from engine performance and tire pressure to detecting road conditions for autonomous driving features. AI systems, used for real-time decision-making in driver assistance technologies and autonomous vehicles, require vast amounts of data processing power, further increasing the load on a vehicle's electrical systems. This surge in data collection and analysis necessitates not only robust computational capabilities but also more efficient power distribution to handle the added demand. The growing reliance on software, AI, and interconnected systems places new pressures on both the power supply and cooling systems, pushing the evolution of automotive electrical architectures to be more efficient, scalable, and resilient.

SUMMARY

This disclosure relates to automotive computing architectures generally and more specifically to power control in automotive computing architectures. The approaches disclosed herein include the concept of a phased wake sequence in which different subsystems of the computing architecture are powered on in different phases. The subsystems can be divided into groups of subsystems which are powered on in series in those different phases. The groups can consist of single subsystems or a plurality of subsystems. In specific embodiments, each group of subsystems is powered on in response to an action taken by a group that was previously powered on. The subsystems of the computing architecture can be assigned to these groups, and the actions taken by the groups can be carefully selected to maximize the utility of the automotive computing architecture in different scenarios while minimizing the amount of power consumed to provide that utility.

The groups of subsystems mentioned in the prior paragraph can include one or more subsystems. The subsystems can be subservient to a main controller of the automotive computing architecture such as a central control module, engine control module (ECM), or body control module (BCM). The subsystems can be supplied with power by a power control module (PCM). As is known in the automotive computing context, the PCM can be a part of the ECM. The subsystems can also be supplied with power, independently of the PCM, from a dedicated power supply that is available for the subsystem. For example, a subsystem could have a direct physical electrical connection to a power regulator that is coupled to the battery or alternator of the automobile and could be able to draw power from that direct physical electrical connection as soon as the device is instructed to draw power or self-initiates a power draw without any commands or control signals being issued from the PCM.

The groups of subsystems could be powered on in different phases and in different series of phases. The subsystems could be powered on in response to various actions taken by a group of subsystems that were previously powered on even if the PCM of the automotive computing architecture has not been activated. In specific embodiments, a first group of subsystems in a series of phases can be in an always-on state and can be configured to detect an external event, which then causes the first group of subsystems to take an action that powers on a second group of subsystems in series in the next phase. The grouping of subsystems and the order in which the groups are activated can depend upon the scenario that the automotive computing system is experiencing. Furthermore, specific subsystems can belong to different groups in different scenarios. For example, a specific subsystem could belong to a second group in a series of phases that are meant to accommodate a driver detection scenario and a third group in a different series of phases that are meant to accommodate a different scenario.

In specific embodiments of the invention, an automotive computing system is provided. The automotive computing system could comprise at least three subsystems including a first subsystem of the at least three subsystems that is in an always-on power domain, a second subsystem of the at least three subsystems that is powered on from a sleep state in response to an event from the first subsystem, and a third subsystem of the at least three subsystems that is powered on, from an off state, after the first subsystem and the second subsystem are powered on.

In specific embodiments of the invention, a method for an automotive computing system having at least three subsystems is provided. The method could comprise operating a first subsystem of the at least three subsystems in an always-on power domain, powering on a second subsystem of the at least three subsystems, from a sleep state, in response to an event from the first subsystem, and powering on a third subsystem of the at least three subsystems, from an off state, after the first subsystem and the second subsystem are powered on.

In specific embodiments of the invention, an automotive computing system is provided. The automotive computing system could have at least three subsystems, a means for operating a first subsystem of the at least three subsystems in an always-on power domain, a means for powering on a second subsystem of the at least three subsystems, from a sleep state, in response to an event detected by the first subsystem, and a means for powering on a third subsystem of the at least three subsystems, from an off state, after the first subsystem and the second subsystem are powered on.

BRIEF DESCRIPTION OF THE DRAWINGS

The accompanying drawings illustrate various embodiments of systems, methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 3 provides a subsystem diagram with an overlain flowchart illustrating methods for phased power provisioning for different subsystems in an automotive computing architecture in a driver detection scenario in accordance with specific embodiments of the inventions disclosed herein.

FIG. 4 provides a subsystem diagram with an overlain flowchart illustrating methods for phased power provisioning for different subsystems in an automotive computing architecture in a sentry mode alert scenario in accordance with specific embodiments of the inventions disclosed herein.

FIG. 5 provides a camera subsystem that may be part of a group of subsystems of a vehicle in accordance with specific embodiments of the inventions disclosed herein.

FIG. 7 provides an example of a method of an automotive computing system using a phased wake sequence in accordance with specific embodiments of the inventions disclosed herein

DETAILED DESCRIPTION

Figure 1:
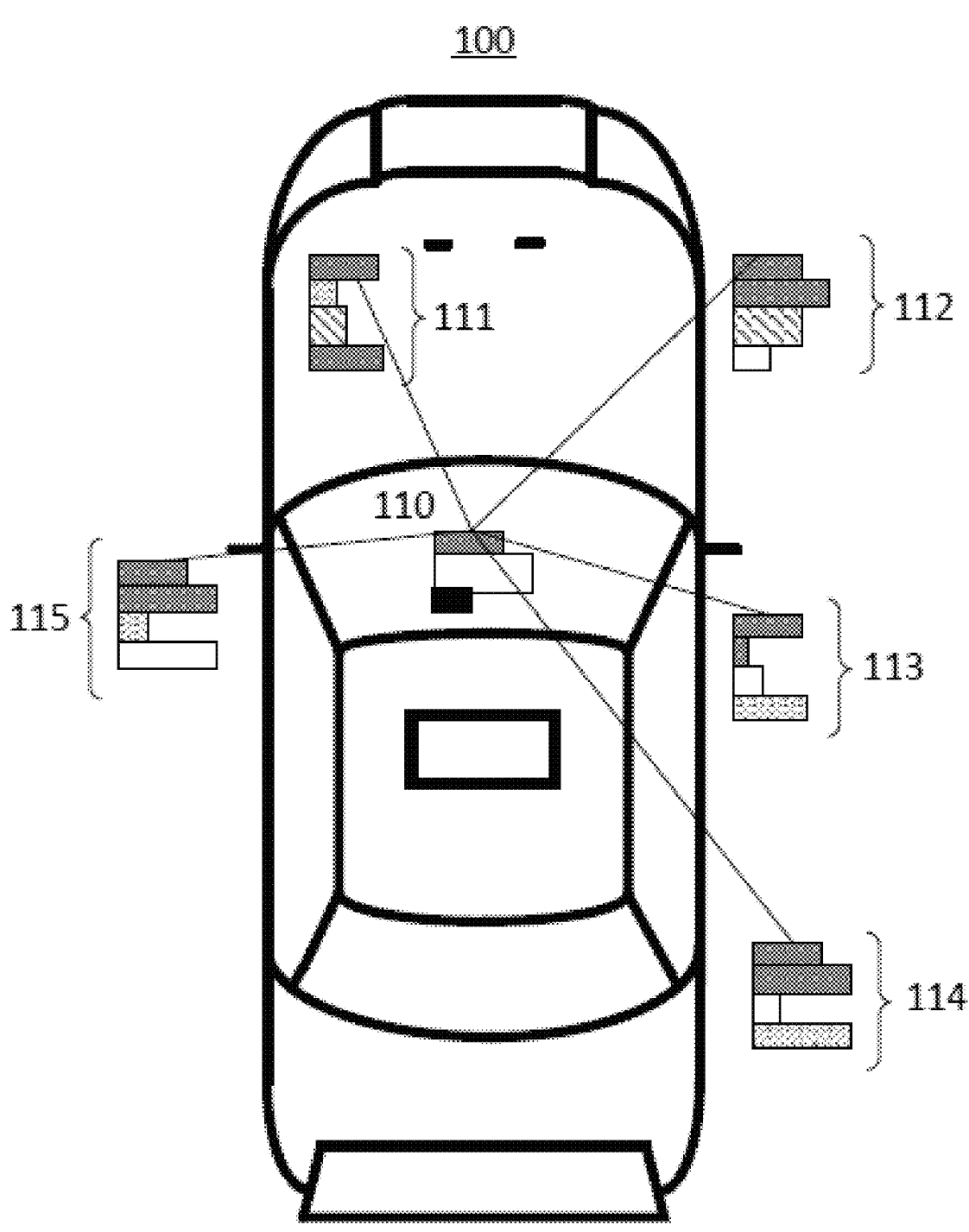
FIG. 1 provides a top-down diagram of various subsystems in an automotive computing architecture in accordance with the related art.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for phased power control in an automotive computing architecture are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

The approaches disclosed herein include the concept of a phased wake sequence in which different subsystems of the computing architecture are powered on in different phases. The subsystems can be divided into groups of subsystems which are powered on in series in those different phases. The groups can consist of single subsystems or a plurality of subsystems. There may be any number of groups of subsystems in the phased wake sequence. In specific embodiments, each group of subsystems may be powered on in response to an action taken by a group that was previously powered on. For example, a certain group of subsystems may be powered on in response to an action taken by the group of subsystems powered on immediately before the certain group of subsystems was powered on in the sequence. As another example, a first group of subsystems may be powered on in response to a second action taken by a second group of subsystems, where the second group of subsystems has already taken a first action to power on a third group of subsystems. In other words, a single group of subsystems may power on multiple other groups of subsystems such that the powering on of subsystems is not chained directly sequentially.

The subsystems of the computing architecture can be assigned to groups, and the actions taken by the groups can be carefully selected to maximize the utility of the automotive computing architecture in different scenarios while minimizing the amount of power consumed to provide that utility. For example, groups of subsystems that use less power may be powered on before groups of subsystems that use more power. In specific embodiments, the groups of subsystems that use more power may only be powered on if the currently powered on groups of subsystems are insufficient to meet the demands of the situation or scenario.

Groups of subsystems may include one or more subsystems. The subsystems can be subservient to a main controller of the automotive computing architecture such as a central control module, engine control module (ECM), or body control module (BCM). The subsystems can be supplied with power by a power control module (PCM); the PCM can be a part of the ECM. The subsystems can also be supplied with power, independently of the PCM, from a dedicated power supply that is available for the subsystem. For example, a subsystem could have a direct physical electrical connection to a power regulator that is coupled to the battery or alternator of the vehicle and could be able to draw power from that direct physical electrical connection as soon as the subsystem is instructed to draw power or self-initiates a power draw without any commands or control signals being issued from the PCM.

Groups of subsystems may include a variety of subsystems with different features, functions, and power requirements. Examples or types of subsystems (or components of subsystems) include near-field communication (NFC), Bluetooth, ultrasonics, cameras, radio, audio, microphones, driver authentication, in-vehicle-infotainment (IVI), advanced driver-assistance system (ADAS), various sensors, security applications, safety applications, logs, and recording functions. Different subsystems may operate on different layers, may use different computing resources, and may be part of a trust hierarchy of an onboard computer. In specific embodiments, the central vehicle computer is always-on (e.g., low power).

The groups of subsystems could be powered on in different phases and in different series of phases. The subsystems could be powered on in response to various actions taken by a group of subsystems that were previously powered on even if the PCM of the automotive computing architecture has not been activated. In specific embodiments, a first group of subsystems in a series of phases can be in an always-on state and can be configured to detect an external event. Detecting the external event may cause the first group of subsystems to take an action that powers on a second group of subsystems in the next phase of the phased wake sequence. The grouping of subsystems, the order in which the groups are activated, and whether a group is activated at all, can depend upon the external event (e.g., scenario) that the automotive computing system is experiencing. Furthermore, specific subsystems can belong to different groups in different scenarios and in response to different external events. For example, a specific subsystem could belong to a second group in a series of phases that are meant to accommodate a driver detection scenario and a third group in a different series of phases that are meant to accommodate a different scenario.

The first group of subsystems may change its mode of operation based on detecting an external event, based on a time constraint, or based on manual input. For example, in the always-on (e.g., low power) mode, a camera of the first group of subsystems may operate at a variable frame rate. In specific embodiments, a region of interest mask is active. The camera may detect an external event based on a pixel difference, external input (e.g., inertial measurement unit (IMU)), heat, etc. If the vehicle switches from a standby mode (e.g., sentry mode) to an active mode (driver approach mode, unauthorized entry mode, vandalism mode), then the camera may increase its frame rate and photos and videos from the camera may be stored to memory.

FIG. 1 provides a top-down diagram of various subsystems in an automotive computing architecture 100 in accordance with the related art. The automotive computing architecture 100 can include a central controller such as BCM 110. The central controller can include a network connection to various groups of subsystems 111, 112, 113, 114, and 115. The various subsystems can control various aspects of the automobile or obtain data from various sensors on the automobile. The subsystems can be organized into groups based on their location in the car as opposed to being grouped based on their function. The network that connects the groups of subsystems can be a zonal network. The BCM 110 can include a PCM for the automotive computing architecture, or a separate centralized PCM can control power distribution to the various groups of subsystems. A persistent and reoccurring problem of the related art may include limitations of a vendor's hypervisor and operating systems.

In specific embodiments of the inventions disclosed herein, the various subsystems of a computing architecture can be combined into different groups where the groups are powered on in a series of phases. The groups of subsystems can be selected from all the subsystems in the computing architecture. The groups of subsystems can be in different groups in a zonal network. For example, a first group of devices that are in an always-on state may consist of subsystems taken from group 111 and group 115, and a second group of devices that are powered on in response to an event generated by the first group of devices can be taken from group 112 and group 114. The constituents of the groups can change based on different scenarios that the computing architecture is exposed to. For example, a subsystem in group 115 could be in a second group, which is powered on in a second phase, in a first scenario, and the same subsystem in group 115 could be a third group, which is powered on in a third phase in a second scenario. Accordingly, the computing system can balance between various levels of functionality and power consumption to accommodate the needs of the computing architecture in different scenarios.

Figure 2:
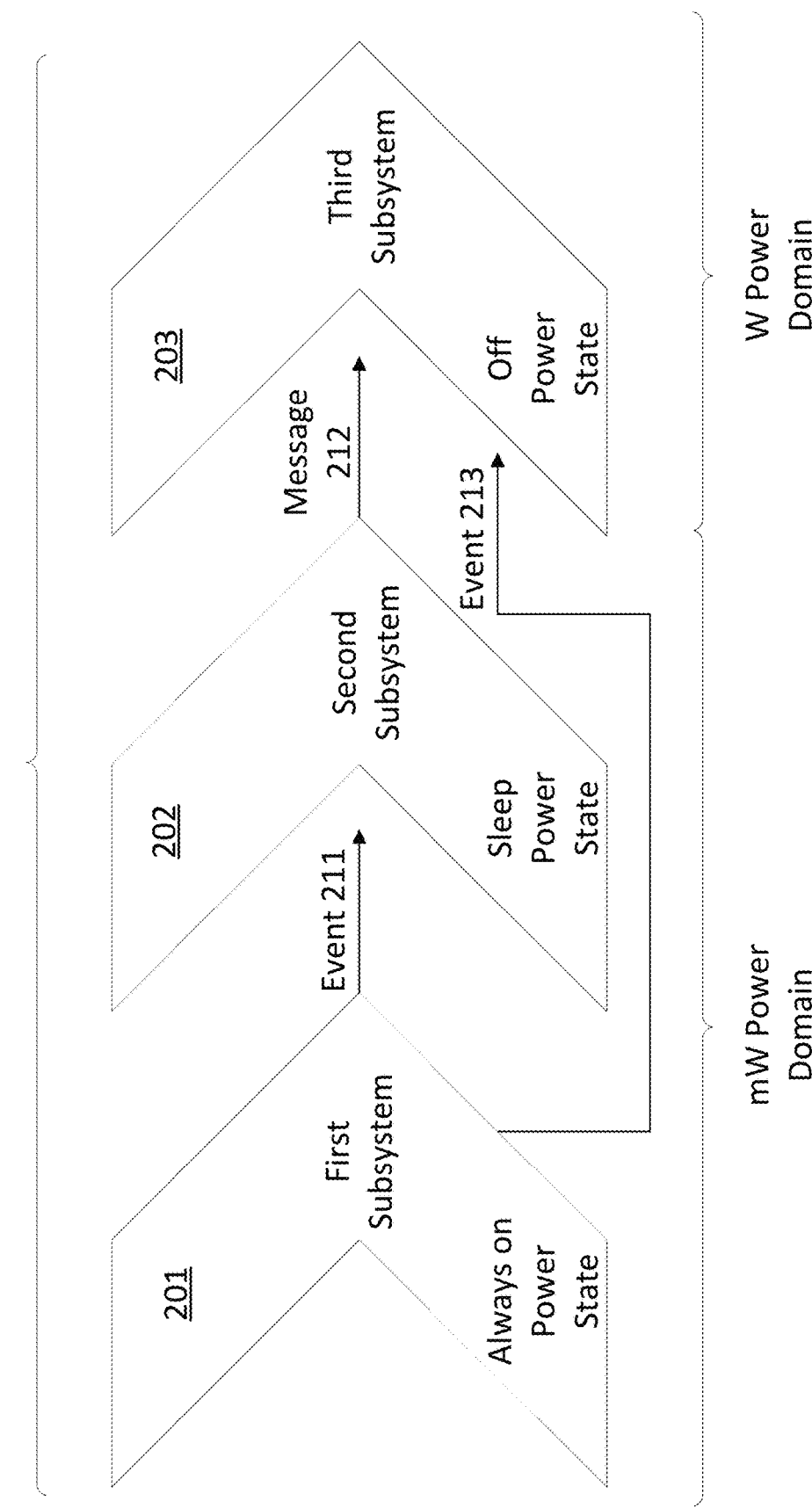
FIG. 2 provides a flowchart illustrating methods for phased power provisioning for different subsystems in an automotive computing architecture in accordance with specific embodiments of the inventions disclosed herein.

FIG. 2 provides flowchart 200 illustrating methods for phased power provisioning for different subsystems in an automotive computing architecture in accordance with specific embodiments of the inventions disclosed herein. Flowchart 200 includes first subsystem 201 that is operated in an always-on power state. As such, regardless of the action of the PCM of the automotive computing environment, power is supplied to the first subsystem. For example, the automobile could be in an off state with the ECM receiving no power or in a sentry state, and the first subsystem could still be receiving power from the battery of the vehicle. First subsystem 201 could be in a first group of subsystems that are in an always-on power state. First subsystem 201 could operate in a milliwatt (mW) power domain such that the group of subsystems consumed power on the order of milliwatts (e.g., less than a Watt).

First subsystem 201 can generate event 211 that is provided to second subsystem 202. Event 211 can be an analog or digital signal. Event 211 may identify a specific event that has occurred by merit of the connectivity of the signal line on which event 211 is sent to second subsystem 202, or by merit of the fact that the event is encoded in a signal that is sent to second subsystem 202. Event 211 can indicate the occurrence of an action taken by first subsystem 201 or an occurrence detected by first subsystem 201. For example, event 211 could be that a driver has been recognized proximate the car in a driver recognition scenario. Subsystem 201 may recognize (e.g., determine) that the keys to the car are approaching (e.g., proximate to) the car. As another example, event 211 could be that an unidentified person or other object has been detected proximate the car in security violation scenario. The security violation scenario can include an attempted break in or vandalism to the automobile. As another example, event 211 could indicate that the car was in an unsafe condition in a safety violation scenario. The safety violation scenario could include the car being in an area that was flooding, close to an uncontrolled fire, in a sink hole, or in some other unsafe environment.

Second subsystem 202 can be powered on in response to receiving event 211 from first subsystem 201. Second subsystem 202 can be the PCM of the automobile and it can be powered on by being woken from a sleep state in response to receiving event 211. Alternatively, second subsystem 202 can be powered on when event 211 is sent to the PCM, and the PCM wakes up from a sleep state to, in turn, awake second subsystem 202 from a sleep state. As another alternative, second subsystem 202 can be awoken from a sleep state through the coupling of second subsystem 202 to a direct connection to the battery of the automobile in response to receipt of event 211 by second subsystem 202 without any control signal being sent to the PCM of the automobile. Second subsystem 202 can be operated in a milliwatt power domain. In specific embodiments, both first subsystem 201 and second subsystem 202 can consume less than 1 Watt of power when second subsystem 202 has been awoken from the sleep state.

Third subsystem 203 can be powered on in response to receiving message 212 from second subsystem 202. Message 212 can be an analog or digital signal. Third subsystem 203 can be the PCM of the automobile and can be powered on by being activated from an off state in response to message 212 being received by an always-on controller or a controller that was powered on from a sleep state in combination with second subsystem 202. Alternatively, third subsystem 203 can be powered on when message 212 is sent to the PCM, and the PCM wakes up from a sleep state to turn on third subsystem 203 from an off state.

An event (e.g., event 211, event 213) may be less sophisticated than a message (e.g., message 212) such that a lower power system may be able to deal with events but might not be able to deal with messages. For example, an event might be an analog signal from a sensor and message might be a digital signal from a microcontroller. In another example, an event might be a digital signal from a microcontroller and a message might be a packetized network signal. In specific embodiments, second subsystem 202 may send message 212 over the zonal network.

In alternative embodiments, third subsystem 203 can be powered on from event 213 generated by first subsystem 201. Event 213 can be an analog or digital signal. Event 213 can indicate the occurrence of an action taken by first subsystem 201 or an occurrence detected by first subsystem 201. Event 211 provided to second subsystem 202 and event 213 provided to third subsystem 203 can be triggered by (or refer to) different events or the same event. Event 213 can power on third subsystem 203 from an off state or from a sleep state. Event 213 can power on third subsystem 203 by being provided to third subsystem 203 directly or by being provided to the PCM so that the PCM could in turn power on third subsystem 203. Third subsystem 203 may operate in a Watts power domain.

The phased wake sequence of first subsystem 201, second subsystem 202, and third subsystem 203 may conserve power (e.g., compared to alternative approaches) without sacrificing the utility of subsystems 201, 202, and 203. The components of subsystems 201, 202, and 203 can be carefully selected to maximize the utility of the automotive computing architecture in different scenarios while minimizing the amount of power consumed to provide that utility. Additionally, events 211 and 213 as well as message 212 may be carefully selected to maximize the utility of the automotive computing architecture in different scenarios while minimizing the amount of power consumed to provide that utility. Accordingly, the computing system can balance between various levels of functionality and power consumption to accommodate the needs of the computing architecture in different scenarios.

FIG. 3 provides a subsystem diagram with an overlain flowchart 300 illustrating methods for phased power provisioning for different subsystems in an automotive computing architecture in a driver detection scenario in accordance with specific embodiments of the inventions disclosed herein.

The subsystem diagram refers to an approach and unlock scenario in which a driver approaches their vehicle at step 301, the driver is authenticated at step 302, a group of subsystems (including a safety subsystem) of the vehicle wakes at step 303, and the vehicle is enabled at step 304. A first group of subsystems may be always-on and refer to a low power radio system of step 301 and to a security subsystem of step 302. A second group of subsystems can be a set of prioritized subsystems that awake (e.g., at step 303) in response to a message from the security subsystem. A third group of subsystems can be the remaining subsystems of the vehicle.

In specific embodiments, the scenario is a driver recognition scenario in which an authorized driver is detected by the automotive computing architecture. In this scenario, the first group of subsystems can include a sensor in the form of a driver detector. The driver detector can be a low-power radio system, key fob sensor, or a smart-phone unlock sensor such as a Bluetooth or near-field communication (NFC) radio system; the driver detector could alternatively be a biometric authentication sensor such as a facial recognition or fingerprint scanner. In specific examples, NFC authentication readiness may be achieved earlier by searching for authorized Bluetooth (BT) pings, Bluetooth Low Energy (BLE) pings, or ultra-wideband (UWB) signals. In specific embodiments, NFC authentication may be augmented by time measurement of radio frequency (RF) signal arrival to protect against inline RF amplifier attack. Driver authentication may include analyzing driver authentication data.

The first group of subsystems can also include a security subsystem with an authentication module that is in an always-on power domain. The first group of subsystems can be a milliwatt power group and can be in an always-on state in order to detect the approach (e.g., step 301) of a driver. The first group of subsystems may also authenticate the driver (e.g., step 302). Accordingly, the first group of subsystems may also include facial recognition components, a fingerprint scanner, or other sensors. In specific embodiments, detecting the approach of the driver (e.g., step 301) may be optional. For example, if the driver detector is a biometric authentication sensor, then the driver may be authenticated once he or she is at the vehicle (e.g., without his or her approach being detected).

At step 303, a second group of subsystems may wake from a sleep state. The second group of subsystems can be a set of prioritized subsystems that awake in response to a message from the security subsystem (e.g., the first group of subsystems). The set of prioritized subsystems can include a safety subsystem, an advanced driver-assistance system (ADAS), and an in-vehicle-infotainment (IVI) subsystem, that can quickly provide the driver with information regarding the state of the automobile and the automotive computing system. The second group of subsystems may operate in the Watt power domain and may have a fast boot time. In specific embodiments, the first set of subsystems can be subsystems that are low power and that detect the approach of a driver and the second set of subsystems are higher power subsystems that include AI processing to authenticate the driver. Accordingly, the automotive computing system can remain in a low power state while not inconveniencing the driver with having to wait for the second set of subsystems to boot up in order to authenticate the driver.

At step 304, a third group of subsystems may be awakened. The third group of subsystems can be the remaining subsystems of the vehicle. In other words, the third group of subsystems may be systems or subsystems of the vehicle that are not permanently on and that did not wake in step 303. In specific embodiments, the third group of subsystems may refer to additional subsystems that are required for enabling the vehicle. That is, the third group of subsystems may not refer to every subsystem of the vehicle that is not already awake but rather only those that are not already awake and that are needed for vehicle operation. For example, the air conditioning system of the vehicle may remain off at step 304.

Granular power control may allow for target wake sequence and order. The different subsystems may be connected to different power supplies or may be separately connected to the same power supply. The phased wake sequence of subsystems of flowchart 300 may conserve power (e.g., compared to alternative approaches) without sacrificing the utility of the subsystems. The components of each subsystem can be carefully selected to maximize the utility of the automotive computing architecture in different scenarios (e.g., approach and unlock scenario) and minimize the latency of the provisioning of that functionality to a user, while minimizing the amount of power consumed to provide that utility. Accordingly, the computing system can balance between various levels of functionality and power consumption to accommodate the needs of the computing architecture in different scenarios.

FIG. 4 provides a subsystem diagram with an overlain flowchart 400 illustrating methods for phased power provisioning for different subsystems in an automotive computing architecture in a sentry mode alert scenario in accordance with specific embodiments of the inventions disclosed herein. The phased power provisioning may wake up groups of subsystems that use minimal power before waking (or powering on) groups of subsystems that use large amounts of power. The alert scenario could be a security violation scenario or a safety violation scenario. The alert scenario may include the vehicle being in a sentry mode at step 401 (with the first group of subsystems powered on), a sentry event waking a second group of subsystems at step 402, waking a third group of subsystems at step 403, waking a fourth group of subsystems at step 404, and powering on a fifth group of subsystems at step 405. The first group of subsystems can include a sentry mode sensor and can be in an always-on state. The second group of subsystems may include a zone subsystem. The third group of subsystems may include a security subsystem. The fourth group of subsystems may include a safety subsystem. The fifth group of subsystems may include an IVI system. Additionally, any of these groups of subsystems may be further grouped together.

In specific embodiments, the first group of subsystems can include a sentry mode sensor which detects the intrusion of an object into a space around the car, and the second group of subsystems can be a higher power set of subsystems that can use AI processing to identify if the object is actually a security or safety threat to the car. For example, the first subsystem could conduct object detection routine using a visible light camera and a basic processor or microcontroller, and the second subsystem could conduct an object recognition routine using the same visible light camera and a higher power processor.

In specific embodiments, the scenario of flowchart 400 is a security event scenario in which a potential unauthorized entry or vandalism to the automobile is detected by the automotive computing architecture. In this scenario, the first group of subsystems can include a sentry mode sensor (e.g., a sentry module). The sentry mode sensor can be or include an ultrasonic sensor, a camera, a Bluetooth or other radio connection to receive a panic indicator from an owner of the vehicle, or any form of proximity or motion sensor. Aspects of the sentry mode sensor (e.g., the camera) can be optimized or customizable. The first group of subsystems can be a milliwatt power group and can be in an always-on state.

At step 401, the first group of subsystems may detect a potential unauthorized entry or vandalism event. The first group of subsystems may change its mode of operation based on detecting the potential unauthorized entry or vandalism event. For example, in the always-on (e.g., low power) mode, the camera may operate at a variable frame rate, with a region of interest mask optionally active. The camera lens may be dual purpose such that an unused area of the sensor (e.g., outside the active region) is configured as near-infrared wavelength (e.g., heat). In specific embodiments, the camera may detect an event if a threshold of heat is satisfied (e.g., sufficient heat is detected). This event may be considered a self-detected event trigger. Once a potential unauthorized entry or vandalism event is detected, the camera may increase its frame rate and photos or videos from the camera may be stored in memory.

Photos and videos from the camera may be stored based on the condition of the vehicle. The condition of the vehicle may be based on the type of external event (if any) that has occurred. The camera may detect an external event based on a pixel difference, external input (e.g., inertial measurement unit (IMU)), heat. In specific embodiments, the condition of the vehicle may be time triggered or manually set (e.g., under management). If the vehicle switches from a standby mode (e.g., sentry mode) to an active mode (driver approach mode, unauthorized entry mode, vandalism mode), then photos and videos from the camera may be stored for later retrieval (e.g., opposed to being rewritten).

The first group of subsystems (e.g., the sentry module) may generate a sentry event (e.g., a signal). The sentry event may trigger the second group of subsystems to wake from sleep at step 402. The second group of subsystems may be a zone subsystem (e.g., zonal subsystem) and may include one or more sentry secure applications. The second group of subsystems may be the closest (physical) subsystem to handle sensor inputs and may include microcontroller unit (MCU) compute resources. The second group of subsystems may act to reduce (e.g., minimize) communication and power consumption used to transfer information to the third group of subsystems. The second group of subsystems may be in the milliwatt power domain.

The third group of subsystems may be woken from a sleep mode or may be powered up at step 403. The third group of subsystems may include a security subsystem with a sentry safety application. The sentry secure application of the second group of subsystems and the sentry safety application of the third group of subsystems may run on physically different subsystems. In specific embodiments, the second group of subsystems and the third group of subsystems may be powered on or woken up together, and the two groups of subsystems may be merged. In this case, the sentry secure application and the sentry safety application may be the same application. The third group of subsystems may be in the milliwatt power domain.

The fourth group of subsystems may include a safety subsystem with one or more logs. The fourth group of subsystems may be in the milliwatt power domain. The fourth group of subsystems, at step 404, may be powered on and may record information from the first group of subsystems (e.g., camera, Sensor X). The information may be related to the alert scenario (e.g., a security violation scenario or a safety violation scenario). The information may include camera footage of a person next to the vehicle, camera footage of a second vehicle closely approaching the vehicle, audio from around or inside the vehicle, status of the windows (e.g., open, closed, broken) of the vehicle, status of the door locks of the vehicle, proximity (e.g., or absence of the proximity) of the key fob, damage to the vehicle, etc. The information may be recorded to a safety memory storage or a log of the fourth group of subsystems. The phased power provisioning may wake up groups of subsystems that use minimal power before waking (or powering on) groups of subsystems that use large amounts of power, accordingly the safety storage of the fourth group of subsystems may be leveraged in most scenarios (e.g., in response to most events). The fourth group of subsystems may end recording information from the first group of subsystems based on an event or signal from the first group of subsystems. The fourth group of subsystems may also end recording if the fourth group of subsystems has insufficient storage to continue recording. In this case, the fifth group of subsystems may be powered on at step 405 to record further information from the first group of subsystems.

The fifth group of subsystems may include (or be) an IVI subsystem and may operate in the watts power domain. The fifth group of subsystems may include IVI storage (e.g., IVI subsystem memory), one or more radios, one or more logs, and real time monitoring of sensors. The fifth group of subsystems may be powered on from the off state in response to a second event detected by the first group of subsystems (e.g., camera, Sensor X) or in response to a message from the fourth group of subsystems.

In specific embodiments, the fourth group of subsystems may send a message to the fifth group of subsystems based on a storage capacity of the fourth group of subsystems (e.g., safety subsystem memory). The fifth group of subsystems may be powered on from the off state in response to the message from the fourth group of subsystems at step 405. The fifth group of subsystems may store information from one or more sensors of the first group of subsystems.

In specific embodiments, the fifth group of subsystems may receive a message from the second group of subsystems (e.g., the zone subsystem in a zonal network). The fifth group of subsystems may be powered on in response to the message sent from the second group of subsystems on the zonal network. The second group of subsystems may send the message to the fifth group of subsystems based on a low or insufficient storage capacity of the fourth group of subsystems (e.g., safety subsystem memory).

Once powered on, the fifth group of subsystems may record information from the first group of subsystems (e.g., camera, Sensor X). The fifth group of subsystems may store the information in IVI storage or a log. In specific examples, the fourth group of subsystems (e.g., safety subsystem) has sufficient storage to record information from the first group of subsystems and the fifth group of subsystems is not powered on. In specific examples, the fourth group of subsystems (e.g., safety subsystem) does not have sufficient storage to record information from the first group of subsystems and the fifth group of subsystems is powered on to record the information.

The phased wake sequence of the subsystems may conserve power (e.g., compared to alternative approaches) without sacrificing the utility of the subsystems. The components of the subsystems can be carefully selected to maximize the utility of the automotive computing architecture in different scenarios (e.g., sentry mode scenario) while minimizing the amount of power consumed to provide that utility. Subsystems or groups of subsystems may have fast boot times. Additionally, the events and messages may be carefully selected to maximize the utility of the automotive computing architecture in different scenarios while minimizing the amount of power consumed to provide that utility. Accordingly, the computing system can balance between various levels of functionality and power consumption to accommodate the needs of the computing architecture in different scenarios.

FIG. 5 depicts camera subsystem 500 that may be part of group of subsystems of a vehicle in accordance with specific embodiments of the inventions disclosed herein. For example, camera subsystem 500 can be part of a sentry mode sensor system. Camera subsystem 500 may always be on. Camera subsystem 500 may operate according to different modes. For example, if the vehicle is in a standby mode (e.g., sentry mode), camera subsystem 500 may operate in a standby, always-on, or low-power mode. If the vehicle is in an active mode (driver approach mode, unauthorized entry mode, vandalism mode), then camera subsystem 500 may likewise be in an active mode with an increased photo-taking rate or higher quality video. Camera subsystem 500 may include one or more complementary metal-oxide-semiconductor (CMOS) sensors, color (RGB, RGGB, RCCC, RGGCy, etc.) sensors, and infrared sensors.

Camera subsystem 500 may have camera view 501. Camera view 501 may be split into different regions. Region of interest 502 may be distinguished by a region of interest mask. In specific embodiments, camera subsystem 500 may include multiple regions of interest 502. The one or more regions of interest 502 may be located within one or more active regions 503 of the sensor (e.g., camera), outside active regions 503 (e.g., within infrared (IR) region 504), or both inside and outside of active regions 503. Infrared region 504 may be outside active region 503, but still within camera view 501, and may be configured to detect heat (e.g., infrared (IR), near-infrared wavelengths).

Aspects of camera subsystem 500 may be optimized or customizable. Camera subsystem 500 may be a ring type of camera, with associated power saving techniques, adapted to in-vehicle use. Camera subsystem 500 may be built with a lens (outer), a sensor (middle), and a sensor controller integrated circuit (IC) with input/output. The lens may support colors and the sensors may detect light. One or more sensors of camera subsystem 500 may detect heat (e.g., near infrared), which may be the same sensors as the color (e.g., RGB) camera. Camera subsystem 500 may also be built to have one or more composite lenses to use IR in sentry mode using perimeter pixels (e.g., IR region 504). In specific embodiments, movement may be detected in multiple regions (e.g., active regions 503, regions of interest 502, infrared regions 504, visible regions, perimeter pixel regions). Information from the active sensor region of a CMOS sensor may be cropped, then filtered with an RGB (e.g., RGGB, RCCC, RGGCy, etc.) filter, an IR (e.g., near IR) filter, and a camera lens (e.g., filter). The CMOS sensor regions of interest may be filtered within the CMOS sensor (or other sensors) or may be filtered close to (e.g., at) a sensor controller.

In the always-on low-power mode, camera subsystem 500 may operate at a five video frame sync (<200 ms) and with milliwatt power. In the always-on (e.g., low power) mode, camera subsystem 500 may operate at a variable frame rate, with a region of interest mask optionally active. In specific embodiments, camera subsystem 500 may always be capturing images local to the sensor. Photos and videos from the camera may be stored based on the condition or mode of the vehicle. The condition of the vehicle may be based on the type of external event (if any) that has occurred. In specific embodiments, the condition of the vehicle may be time triggered or manually set (e.g., under management). In specific embodiments, camera subsystem 500 identifies an external event or otherwise triggers a condition change.

There are many ways that camera subsystem 500 may trigger switching the condition of the vehicle. Camera subsystem may detect an external event based on a pixel difference, external input (e.g., inertial measurement unit (IMU)), or heat. For example, the camera lens may be dual purpose such that an area of the sensor (e.g., outside the active region 503) is configured as infrared region 504 (e.g., heat). In specific embodiments, the camera may detect an event if a threshold of heat is satisfied (e.g., sufficient heat is detected). This event may be considered a self-detected event trigger. As another example, if a threshold quantity of pixels have changed in region of interest 502 of camera subsystem 500, then the vehicle may switch to an active mode from a standby mode (e.g., a group of subsystems may be powered on or woken up).

The condition or mode of the vehicle may be time triggered, manually set, or triggered by an event. In specific embodiments, the event trigger may be self-generated by the CMOS sensor regions of interest. If the vehicle switches from a standby mode (e.g., sentry mode) to an active mode (driver approach mode, unauthorized entry mode, vandalism mode), then photos and videos from the camera may be stored. The camera may be instant-on (e.g., within 2-3 frame time) as part of the change to the active mode. The time for the camera to change to a fully operational mode may be limited by the wake time of an ethernet/serial link. In the active mode, photos and videos from the camera may be saved (e.g., via an ethernet link). The ethernet link may operate within a certain speed or within <250 ms from a link standby mode. In specific embodiments, a full end-to-end (E2E) low-power data-path wake may contribute to storing information from camera subsystem 500.

Camera subsystem 500 may detect events that trigger other subsystems to power on. Accordingly, these subsystems may remain off until an event is detected. Photo, video, and other information obtained from camera subsystem 500 may be stored using different subsystems, using low-power subsystems first until they run out of storage capacity. The computing system of the vehicle can thus balance various levels of functionality and power consumption to accommodate the needs of the computing architecture in different scenarios and based on different events.

Figure 6:
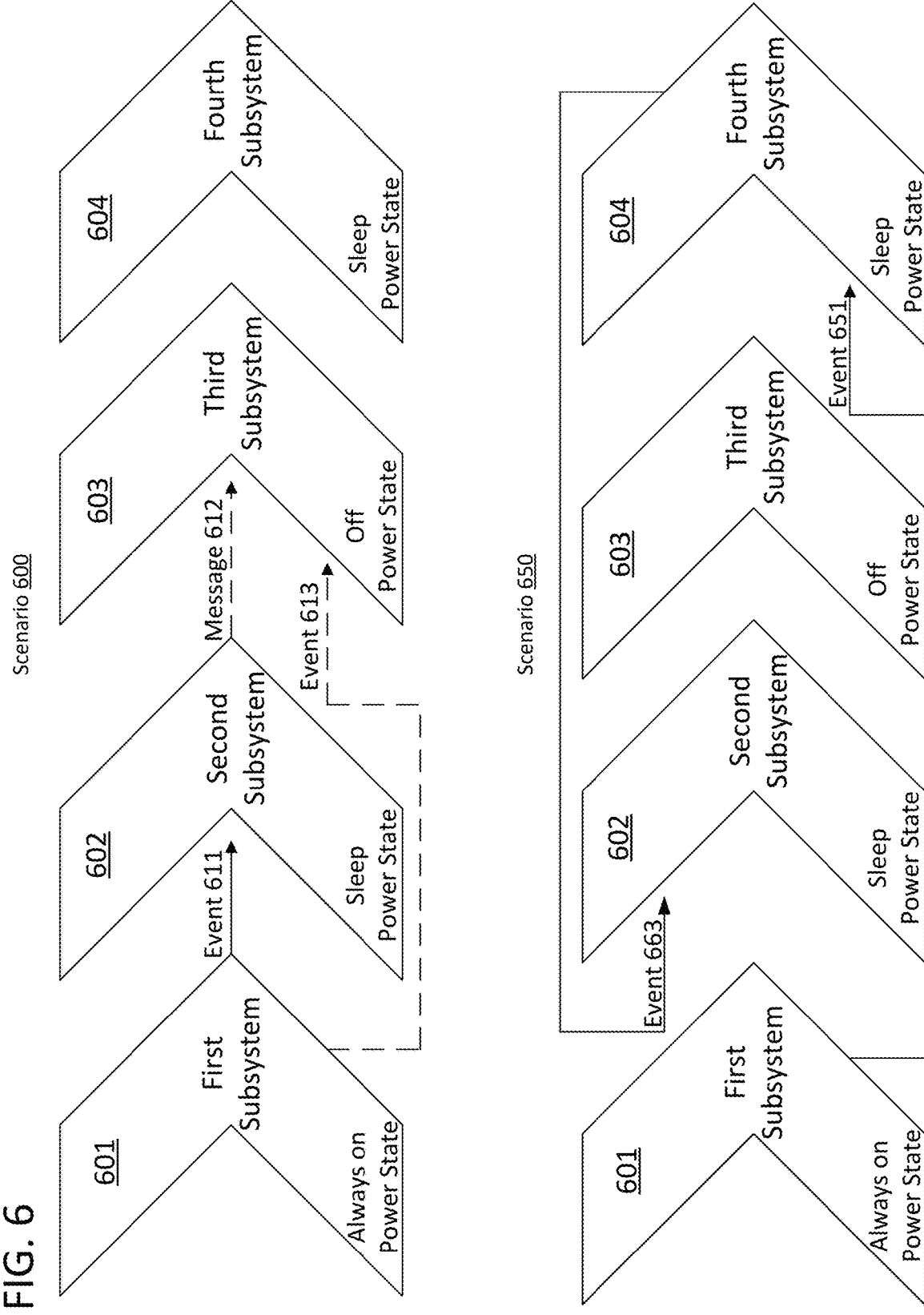
FIG. 6 provides two example scenarios of phased wake sequences in accordance with specific embodiments of the inventions disclosed herein.

FIG. 6 depicts two example scenarios of phased wake sequences in accordance with specific embodiments of the inventions disclosed herein. The phase wake sequences may be part of an automotive computing architecture. In each scenario of FIG. 6, the system (e.g., automotive computing system) that implements scenario 600 and scenario 650 may have four subsystems. Each subsystem may constitute a group of smaller subsystems. Other examples of scenarios may include any quantity of (e.g., less than four, more than four) subsystems. The components of each subsystem 601 through 604 and the order in which each subsystem 601 through 604 is activated (and whether a subsystem is activated at all) can depend upon the scenario that the automotive computing system is experiencing. Furthermore, specific subsystems can belong to different groups in different scenarios. For example, a specific subsystem could belong to a second group in a series of phases that are meant to accommodate a driver detection scenario and a third group in a different series of phases that are meant to accommodate a different scenario. In specific embodiments, the system may only implement scenario 600, only implement scenario 650, or a combination of multiple scenarios. Additional scenarios are possible, although only two are shown.

At the beginning of either scenario 600 or 650, the system may be in a standby or sentry mode. First subsystem 601 may be in an always-on power state (e.g., always-on power domain), second subsystem 602 may be in a sleep power state, third subsystem 603 may be off, and fourth subsystem 604 may be in a sleep power state.

In first scenario 600, second subsystem 602 may be powered on from a sleep state in response to event 611 from first subsystem 601. Third subsystem 603 may be powered on, from an off state, after first subsystem 601 and second subsystem 602 are powered on. Third subsystem 603 may, in some examples, be powered on due to event 613 from first subsystem 601. Event 613 may be the same event as event 611 or may be a different event. Event 613 may be triggered by the same external event that triggers event 611 or may be triggered by a different external event. Third subsystem 603 may, in some examples, be powered on due to message 612 from second subsystem 602. Message 612 may be generated or sent in response to second subsystem 602 powering on, to event 611, or to another occurrence. In scenario 600, fourth subsystem 604 may remain in the sleep power state. In specific embodiments, fourth subsystem 604 may be powered on at another time or in response to another event.

An event (e.g., event 611, event 613, event 651, event 663) may be less sophisticated than a message (e.g., message 612) such that a lower power system may be able to deal with events but might not be able to deal with messages. For example, an event might be an analog signal from a sensor and message might be a digital signal from a microcontroller. In another example, an event might be a digital signal from a microcontroller and a message might be a packetized network signal. In specific embodiments, second subsystem 602 may send message 612 over the zonal network.

In second scenario 650, fourth subsystem 604 is powered on from a sleep state in response to event 651 detected or generated by first subsystem 601. Second subsystem 602 may be powered on from a sleep state in response to event 663 generated by fourth subsystem 604. In scenario 650, third subsystem 603 may remain in the off power state. In specific embodiments, third subsystem 603 may be powered on at another time or in response to another event.

The components of each subsystem 601 through 604 and the order in which each subsystem 601 through 604 is activated (and whether a subsystem is activated at all) can depend upon the scenario that the automotive computing system is experiencing. For example, NFC, Bluetooth, authentication, safety subsystems, IVI, and ADAS may be enabled for one scenario while Ultrasonics, camera, Bluetooth, Sensor X, sentry secure application, sentry safety application, logs, radios, and IVI may be enabled for a different scenario. Components of subsystems 601 through 604 may be regrouped for different scenarios. That is, a first subsystem in one scenario may refer to none, some, or all the components of a first subsystem in another scenario. The subsystem in the other scenario may include additional components not included in the first subsystem of the first scenario.

Subsystems 601 through 604 may refer to a variety of subsystems, and events 611, 613, 651, and 663 may refer to a variety of events. In specific embodiments, first subsystem 601 is a security subsystem that has an authentication module, second subsystem 602 is an in-vehicle infotainment (IVI) system, and event 611 is a driver authentication event generated by the authentication module. In specific embodiments, first subsystem 601 is a sentry subsystem that has a sentry module, second subsystem 602 is a security subsystem, and event 611 is a sentry event generated by the sentry module. In specific embodiments, second subsystem 602 is a safety subsystem which records information from first subsystem 601 in a safety subsystem memory, and third subsystem 603 is an IVI subsystem having an IVI subsystem memory.

In specific embodiments, first subsystem 601 is a security subsystem having an authentication module, fourth subsystem 604 is an IVI system, and event 651 is a driver authentication event generated by the authentication module. In specific embodiments, first subsystem 601 is a sentry subsystem that has a sentry module, fourth subsystem 604 is a security subsystem, and event 651 is a sentry event generated by the sentry module. In specific embodiments, fourth subsystem 604 is a safety subsystem which records information from first subsystem 601 in a safety subsystem memory, and second subsystem 602 is an IVI subsystem having an IVI subsystem memory.

The phased wake sequence of first subsystem 601, second subsystem 602, third subsystem 603, and fourth subsystem 604 may conserve power (e.g., compared to alternative approaches) without sacrificing the utility of subsystems 601 through 604. The components of subsystems 601 through 604 can be carefully selected to maximize the utility of the automotive computing architecture in different scenarios while minimizing the amount of power consumed to provide that utility. Additionally, events 611, 613, 651, and 663 as well as message 612 may be carefully selected to maximize the utility of the automotive computing architecture in different scenarios while minimizing the amount of power consumed to provide that utility. Accordingly, the computing system can balance between various levels of functionality and power consumption to accommodate the needs of the computing architecture in different scenarios.

FIG. 7 illustrates an example of method 700 of an automotive computing system using a phased wake sequence in accordance with specific embodiments of the inventions disclosed herein. Method 700 may be implemented by an automotive computing system including at least three subsystems. In specific embodiments, the at least three subsystems may include a security subsystem, safety subsystem, zone subsystem, or a combination thereof. In specific embodiments, the automotive computing system may also include an authentication module, IVI system, radio (e.g., low-power radio), sentry module, memory, and zonal network. In specific embodiments, the system that implements method 700 may include means for performing each of steps 702 through 704. Steps or portions of steps of method 700 may be omitted, duplicated, rearranged, or otherwise deviate from the form shown. The whole process of method 700 may be performed one or more times.

At step 702, a first subsystem of the at least three subsystems may operate in an always-on power domain.

At step 704, a second subsystem of the at least three subsystems may be powered on from a sleep state. The second subsystem may be powered on in response to an event from the first subsystem.

At step 706, a third subsystem of the at least three subsystems may be powered on from an off state. The third subsystem may be powered on after the first subsystem and the second subsystem are powered on (e.g., after step 704). The first, second, and third subsystems may correspond to various components of the automotive computing system. The event may correspond to a variety of external or internal events.

In specific embodiments, the first subsystem is a security subsystem having an authentication module, the second subsystem is an IVI system, and the event is a driver authentication event generated by the authentication module. Additionally, the always-on power domain may be a milliwatt level power domain, the second subsystem may be in a second power domain, and the second power domain may be a watt level power domain. In specific embodiments, the always-on power domain includes a low-power radio that provides driver authentication data to the authentication module.

In specific embodiments, the first subsystem is a sentry subsystem having a sentry module, the second subsystem is a security subsystem, and the event is a sentry event generated by the sentry module. Additionally, the always-on power domain may be a milliwatt level power domain, the second subsystem may be in a second power domain, and the second power domain may be a milliwatt level power domain. In specific embodiments, the third subsystem is powered on from the off state in response to a second event detected by the first subsystem. In specific embodiments, the third subsystem includes a radio and is in a watt level power domain. In specific embodiments, the second subsystem includes a safety subsystem which records information from the first subsystem in a safety subsystem memory, the third subsystem is an IVI subsystem having an IVI subsystem memory, and the IVI subsystem is in a watt level power domain. In specific embodiments, the third subsystem is powered on from the off state in response to a message from the second subsystem, and the second subsystem sends the message based on a capacity of the safety subsystem memory. In specific embodiments, the second subsystem is a zone subsystem in a zonal network, and the third subsystem is powered on in response to a message sent from the second subsystem on the zonal network.

In specific embodiments, method 700 is implemented by an automotive computing system including means for performing the steps of method 700. For example, a means for operating a first subsystem of the at least three subsystems in an always-on power domain may include one or more power sources, controllers, microcontrollers, processors, microprocessors, processing cores, graphics processing units (GPUs), memories, operating systems, software, hardware, systems on a chip (SoCs), printed circuit boards (PCBs), Wi-Fi modules, and sensors (e.g., cameras, etc.). A means for powering on a second subsystem of the at least three subsystems, from a sleep state, in response to an event from the first subsystem may include one or more wires, power sources, controllers, microcontrollers, processors, microprocessors, processing cores, GPUs, memories, operating systems, software, hardware, SoCs, PCBs, Wi-Fi modules, and sensors (e.g., cameras, etc.). A means for powering on a third subsystem of the at least three subsystems, from an off state (after the first subsystem and the second subsystem are powered on), may include one or more wires, power sources, controllers, microcontrollers, processors, microprocessors, processing cores, GPUs, memories, operating systems, software, hardware, SoCs, PCBs, Wi-Fi modules, and sensors (e.g., cameras, etc.).

The phased wake sequence of the at least three subsystems may conserve power (e.g., compared to alternative approaches) without sacrificing the utility of the subsystems. The components of the subsystems can be carefully selected to maximize the utility of the automotive computing architecture in different scenarios while minimizing the amount of power consumed to provide that utility. Additionally, events and messages may be carefully selected to maximize the utility of the automotive computing architecture in different scenarios while minimizing the amount of power consumed to provide that utility. Accordingly, the computing system can balance between various levels of functionality and power consumption to accommodate the needs of the computing architecture in different scenarios.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure were generally directed to automobiles, the same approaches could be applied to computing architectures for any form of vehicles including boats, submersibles, two-wheeled vehicles, scooters, fixed wing or propeller aircraft, drones, spacecraft, and other vehicles. Although examples in the disclosure were generally directed to driver recognition and alert scenarios, the scenarios could also include a switch to autonomous driving with the third subsystems in the examples above being higher power sensors such as LIDAR sensors which are only activated when the vehicle is transferred to an autonomous navigation mode. These and other modifications and variations to the present invention may be practiced by those skilled in the art, without departing from the scope of the present invention, which is more particularly set forth in the appended claims.

What is claimed is:

1. An automotive computing system comprising:
at least three subsystems;
a first subsystem of the at least three subsystems that is in an always-on power domain;
a second subsystem of the at least three subsystems that is powered on from a sleep state in response to an event from the first subsystem; and
a third subsystem of the at least three subsystems that is powered on, from an off state, after the first subsystem and the second subsystem are powered on;
wherein the first subsystem is a sentry subsystem having a sentry module;
wherein the second subsystem is a security subsystem;
wherein the event is a sentry event generated by the sentry module;
wherein the always-on power domain is a milliwatt level power domain;
wherein the second subsystem is in a second power domain; and
wherein the second power domain is a milliwatt level power domain.

2. The automotive computing system of claim 1, wherein:
the event is generated by the first subsystem in a first scenario;
the automotive computing system comprises a fourth subsystem in the at least three subsystems that is powered on from a second sleep state in response to a second event detected by the first subsystem;
the second subsystem is powered on from the sleep state in response to a third event generated by the fourth subsystem; and
the third event is generated by the first subsystem in a second scenario.

3. The automotive computing system of claim 1, wherein:
the second subsystem is a zone subsystem in a zonal network; and
the third subsystem is powered on in response to a message sent from the second subsystem on the zonal network.

4. The automotive computing system of claim 1, wherein:
the third subsystem is powered on from the off state in response to a second event detected by the first subsystem.

5. The automotive computing system of claim 4, wherein:
the third subsystem includes a radio and is in a watt level power domain.

6. A method for an automotive computing system, having at least three subsystems, comprising:
operating a first subsystem of the at least three subsystems in an always-on power domain;
powering on a second subsystem of the at least three subsystems, from a sleep state, in response to an event from the first subsystem; and
powering on a third subsystem of the at least three subsystems, from an off state, after the first subsystem and the second subsystem are powered on;
wherein the first subsystem is a sentry subsystem having a sentry module;
wherein the second subsystem is a security subsystem;
wherein the event is a sentry event generated by the sentry module;
wherein the always-on power domain is a milliwatt level power domain;
wherein the second subsystem is in a second power domain; and
wherein the second power domain is a milliwatt level power domain.

7. The method of claim 6, wherein:
the third subsystem is powered on from the off state in response to a second event detected by the first subsystem.

8. The method of claim 7, wherein:
the third subsystem includes a radio and is in a watt level power domain.

9. The method of claim 6, wherein:
the second subsystem is a safety subsystem which records information from the first subsystem in a safety subsystem memory;
the third subsystem is an in-vehicle-infotainment subsystem having an in-vehicle-infotainment subsystem memory; and
the in-vehicle-infotainment subsystem is in a watt level power domain.

10. The method of claim 9, wherein:
the third subsystem is powered on from the off state in response to a message from the second subsystem; and
the second subsystem sends the message based on a capacity of the safety subsystem memory.

11. The method of claim 6, wherein:
the second subsystem is a zone subsystem in a zonal network; and
the third subsystem is powered on in response to a message sent from the second subsystem on the zonal network.

12. An automotive computing system, having at least three subsystems, comprising:
a means for operating a first subsystem of the at least three subsystems in an always-on power domain;
a means for powering on a second subsystem of the at least three subsystems, from a sleep state, in response to an event from the first subsystem; and a means for powering on a third subsystem of the at least three subsystems, from an off state, after the first subsystem and the second subsystem are powered on;

wherein the first subsystem is a sentry subsystem having a sentry module;

wherein the second subsystem is a security subsystem;

wherein the event is a sentry event generated by the sentry module;

wherein the always-on power domain is a milliwatt level power domain;

wherein the second subsystem is in a second power domain; and wherein the second power domain is a milliwatt level power domain.

13. An automotive computing system comprising:

at least three subsystems;

a first subsystem of the at least three subsystems that is in an always-on power domain;

a second subsystem of the at least three subsystems that is powered on from a sleep state in response to an event from the first subsystem; and a third subsystem of the at least three subsystems that is powered on, from an off state, after the first subsystem and the second subsystem are powered on;

wherein the first subsystem is a security subsystem having an authentication module;

wherein the second subsystem is an in-vehicle-infotainment system;

wherein the event is a driver authentication event generated by the authentication module;

wherein the always-on power domain is a milliwatt level power domain;

wherein the second subsystem is in a second power domain; and wherein the second power domain is a watt level power domain.

14. The automotive computing system of claim 13, wherein:

the always-on power domain includes a low-power radio that provides driver authentication data to the authentication module.

15. An automotive computing system comprising:

at least three subsystems;

a first subsystem of the at least three subsystems that is in an always-on power domain;

a second subsystem of the at least three subsystems that is powered on from a sleep state in response to an event from the first subsystem; and a third subsystem of the at least three subsystems that is powered on, from an off state, after the first subsystem and the second subsystem are powered on;

wherein the event is generated by the first subsystem in a first scenario;

wherein the automotive computing system comprises a fourth subsystem in the at least three subsystems that is powered on from a second sleep state in response to a second event detected by the first subsystem;

wherein the second subsystem is powered on from the sleep state in response to a third event generated by the fourth subsystem; and wherein the third event is generated by the first subsystem in a second scenario.

16. An automotive computing system comprising:

at least three subsystems;

a first subsystem of the at least three subsystems that is in an always-on power domain;

a second subsystem of the at least three subsystems that is powered on from a sleep state in response to an event from the first subsystem; and a third subsystem of the at least three subsystems that is powered on, from an off state, after the first subsystem and the second subsystem are powered on;

wherein the first subsystem is a sentry subsystem having a sentry module;

wherein the second subsystem is a safety subsystem which records information from the first subsystem in a safety subsystem memory;

wherein the third subsystem is an in-vehicle-infotainment subsystem having an in-vehicle-infotainment subsystem memory; and wherein the in-vehicle-infotainment subsystem is in a watt level power domain.

17. The automotive computing system of claim 16, wherein:

the third subsystem is powered on from the off state in response to a message from the second subsystem; and the second subsystem sends the message based on a capacity of the safety subsystem memory.

18. A method for an automotive computing system, having at least three subsystems, comprising:

operating a first subsystem of the at least three subsystems in an always-on power domain;

powering on a second subsystem of the at least three subsystems, from a sleep state, in response to an event from the first subsystem; and powering on a third subsystem of the at least three subsystems, from an off state, after the first subsystem and the second subsystem are powered on;

wherein the first subsystem is a security subsystem having an authentication module;

wherein the second subsystem is an in-vehicle-infotainment system;

wherein the event is a driver authentication event generated by the authentication module;

wherein the always-on power domain is a milliwatt level power domain;

wherein the second subsystem is in a second power domain; and wherein the second power domain is a watt level power domain.

19. The method of claim 18, wherein:

the always-on power domain includes a low-power radio that provides driver authentication data to the authentication module.

* * * * *